(12) United States Patent
Saros et al.

(10) Patent No.: US 9,225,800 B2
(45) Date of Patent: Dec. 29, 2015

(54) DISTRIBUTION OF CONTENT ITEMS TO USER DEVICES IN A MOBILE ENVIRONMENT

(71) Applicant: Telefonaktiebolaget L M Ericsson (publ), Stockholm (SE)

(72) Inventors: Jakob Saros, Luleå (SE); Tommy Arngren, Södra Sunderbyn (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/283,941

(22) Filed: May 21, 2014

(65) Prior Publication Data
US 2014/0258387 A1    Sep. 11, 2014

Related U.S. Application Data

(62) Division of application No. 13/141,464, filed as application No. PCT/EP2008/011065 on Dec. 23, 2008, now Pat. No. 8,798,524.

(51) Int. Cl.
*H04W 4/06* (2009.01)
*H04L 29/06* (2006.01)
(Continued)

(52) U.S. Cl.
CPC ............ *H04L 67/42* (2013.01); *H04L 12/1859* (2013.01); *H04L 63/102* (2013.01);
(Continued)

(58) Field of Classification Search
CPC . H04L 67/42; H04L 12/1859; H04L 12/1895; H04L 63/102; H04L 67/20; H04L 67/28; H04L 67/2804; H04L 67/2823; H04L 67/2838; H04L 67/306

USPC .......... 455/3.01, 198, 414.3, 456.2; 709/203, 709/231, 228, 217; 705/14.73, 65; 707/743, 707/749, 736, 756, 752; 725/54, 87; 715/733, 753, 751, 756, 757, 758; 706/12; 710/1
See application file for complete search history.

(56) References Cited

U.S. PATENT DOCUMENTS

| 2002/0004744 A1 | 1/2002 | Muyres et al. |
| 2003/0050062 A1 | 3/2003 | Chen et al. |

(Continued)

FOREIGN PATENT DOCUMENTS

| JP | 2001236282 A | 8/2001 |
| JP | 2002132736 A | 5/2002 |

(Continued)

OTHER PUBLICATIONS

SICAP, Multimedia Mobile Gateway, Jan. 29, 2007, retrieved on Sep. 29, 2009, retrieved from Internet: http://store.businesssoftware.nokia.com/images/EN/user_guide_1752.pdf.

(Continued)

*Primary Examiner* — Tan H Trinh
(74) *Attorney, Agent, or Firm* — Patent Portfolio Builders, PLLC (57) ABSTRACT

The invention relates to a technique for controlling the distribution of content items such as advertisements, news, etc., to user devices in a mobile communications network. A method embodiment of the technique is performed in a distribution control gateway of the mobile communications network and comprises the steps of receiving, from a content provider server, a target user indication indicative of one or more target user devices for presentation of a content item; accessing a provider registry for determining a provider authorization of the content provider server; accessing a user registry for determining a user authorization for receiving the content item from the content provider server; and initiating a transmission of the content item to one or more of the target user devices.

8 Claims, 9 Drawing Sheets

(51) Int. Cl.
*H04L 12/18* (2006.01)
*H04L 29/08* (2006.01)

(52) U.S. Cl.
CPC .............. *H04L 67/20* (2013.01); *H04L 67/28* (2013.01); *H04L 67/2838* (2013.01); *H04L 67/306* (2013.01); *H04L 12/1895* (2013.01); *H04L 67/2804* (2013.01); *H04L 67/2823* (2013.01)

(56) References Cited

U.S. PATENT DOCUMENTS

| | | |
|---|---|---|
| 2003/0120593 A1 | 6/2003 | Bansal et al. |
| 2003/0229900 A1* | 12/2003 | Reisman ..................... 725/87 |
| 2004/0249768 A1* | 12/2004 | Kontio et al. ................. 705/65 |
| 2005/0034079 A1* | 2/2005 | Gunasekar et al. ........... 715/753 |
| 2007/0042770 A1 | 2/2007 | Yasui et al. |
| 2008/0040354 A1 | 2/2008 | Ray et al. |
| 2008/0320396 A1* | 12/2008 | Mizrachi ........... H04M 1/72561 715/744 |
| 2009/0172552 A1* | 7/2009 | Segel ............................ 715/733 |
| 2009/0187593 A1 | 7/2009 | Chen et al. |
| 2010/0042749 A1* | 2/2010 | Barton ............................. 710/1 |
| 2010/0050098 A1 | 2/2010 | Turner |
| 2010/0146553 A1* | 6/2010 | Lo et al. .......................... 725/54 |
| 2010/0151882 A1 | 6/2010 | Gillies et al. |
| 2011/0138069 A1* | 6/2011 | Momchilov et al. .......... 709/231 |
| 2012/0259950 A1* | 10/2012 | Havekes et al. ............... 709/217 |

FOREIGN PATENT DOCUMENTS

| | | |
|---|---|---|
| JP | 2005531236 A | 10/2005 |
| WO | 2004003801 A1 | 1/2004 |
| WO | 2005038680 A1 | 4/2005 |

OTHER PUBLICATIONS

Office Action received in JP application No. 2011-541101 mailed May 31, 2013 (English Translation).

* cited by examiner

DISTRIBUTION OF CONTENT ITEMS TO USER DEVICES IN A MOBILE ENVIRONMENT

This application is a divisional of U.S. patent application Ser. No. 13/141,464, filed Jun. 22, 2011, which is a National Stage Application of PCT/EP2008/011065, filed Dec. 23, 2008, the disclosures of each of which are incorporated herein by reference in their entirety.

TECHNICAL FIELD

The invention relates to a technique for controlling the distribution of content items such as advertisements, news, etc., to user devices in a mobile communications network.

BACKGROUND

The increasing capabilities of mobile communications networks and mobile user devices (such as mobile phones, smartphones, etc.) enable the provisioning of more complex services to the users of these devices. E-Mail services, Web browsing, and even Web based services are available today for an increasing number of mobile users.

Many of these service applications include that content data is downloaded to the user device on a regular or irregular basis. Content data is understood herein as any kind of (multi) media data such as text data, image data, video data or similar data which are eventually intended for presentation to a user of a mobile user device. Examples of items of content data are advertisements, news, notifications, reminders, etc.

Often multiple such applications related to multiple content provisioning services of one or more content providers are implemented on a single user device. However, each of these applications is treated separately. For example, every single application has to be downloaded and configured by the user. Each application requires the user to configure whether and in which form a provisioning of content items is allowed, whether updates of the application are allowed, etc. This can become a cumbersome task over the time.

From the point of view of the content providers (which generally aim at providing an ever increasing diversity of services) each new service requires a considerable effort for establishing it. Consider, for example, a location-based service provided by a retailer's shop which presents a list of the retailer's goods on the mobile devices of the shop visitors. In order to introduce a similar service for the neighbouring shop, the provider needs a separate service agreement with the mobile network operator. A new service application needs to be installed on user devices, although this application may be very similar to another one that is already available thereon. A new user group has to be established for sending, e.g., advertisements, although there may be a large intersection between this and other, already existing user groups. These examples illustrate in which way the isolated treatment of service applications hinders the introduction of new services.

SUMMARY

There is a demand for a technique for controlling a distribution of content items to user devices over a mobile communications network which simplifies the establishment of new content provisioning services.

This demand is satisfied by a first method for controlling distribution of a content item to user devices in a mobile communications network. The method is performed in a distribution control gateway of the mobile communications network. The method comprises the steps of receiving, from a content provider server, a target user indication indicative of one or more target user devices for presentation of a content item; accessing a provider registry for determining a provider authorization of the content provider server for distributing the content item to the target user devices; accessing, based on the determined provider authorization, a user registry for determining a user authorization for each of one or more of the target user devices for receiving the content item from the content provider server; and initiating, based on the determined one or more user authorizations, a transmission of the content item to one or more of the target user devices.

The mobile communications network can, for example, be a GSM, UMTS or LTE network and the user devices may be adapted for communication with this network. The content item may be a data structure representing a piece of media such as, e.g., a text document, image, video or a combination thereof. The content provider server may be arranged internal or external of the mobile communications network. The distribution of the content item may comprise the transmission of the content item to one or more of the target user devices based on a media data transport service of the mobile communications network such as a broadcast service, a multicast service, a unicast service, or a combination thereof. For example, the 3GPP MBMS (Multimedia Broadcast/Multicast Service) feature may be used for implementing such broadcast or multicast service.

The target user indication may comprise an indication of at least one of one or more specific user devices and a group of user devices associated with the mobile network. For example, in one implementation the target user indication comprises an indication of a user profile parameter value related to user profiles in the user registry. Such user profile parameters may, e.g., be age, gender, location, type of subscription, etc. Such target user indications may be provided as separate message, message part, data field in a message, or in a similar explicit way separately from the related content item to the distribution control gateway.

In other implementations, an address related to the content provider server may be used as a target user indication. For example, a source address of a data packet encapsulating at least a part of the content item may be used for identifying a user or user group. In still another implementation, a type of the content as indicated by the item or determined therefrom may be used as an indication of the intended target users. These target user indications may be implicitly provided to the distribution control gateway, e.g. because they are inherently related to the content item.

The provider authorization may comprise a registration of the content provider server for distributing content items to the mobile communications network. Alternatively, the provider authorization may comprise a type of content the content provider server is authorized to send to the mobile communications network. Still further, the provider authorization may comprise indications of one or more user devices to which the content provider server is authorized to distribute content to. The provider authorization may also comprise any combination of the above variants.

At least one of the one or more user authorizations may indicate a content provider server which is authorized to transmit content to the corresponding user device. Additionally or alternatively, at least one of the one or more user authorizations may indicate a type of content the content provider server is authorized to transmit to the corresponding user device.

The user registry may contain profile parameters such as age, gender and location of the user. Additionally or alternatively, the user registry may contain indications related to multiple content presentation applications implemented on the user device.

In case of a user device having implemented multiple applications, at least one of the one or more user authorizations may comprise multiple application-specific authorizations related to these applications. In one variant, the user registry contains application-specific permissions for the content provider servers.

Some variants of the first method may comprise the initial step of configuring at least one of the one or more user authorizations. For example, a user authorization may be administered according to at least one of a subscription of the user, a corresponding policy of the mobile network operator, and data provided by the content provider server or associated with a provider registry.

The first method may comprise the further steps of determining, based on at least one of the received target user indication, the content item, and an indication of the content provider server from which the target user indication has been received, at least one additional target user device not indicated by the target user indication; accessing the user registry for determining a user authorization for the at least one additional target user device for receiving the content item from the content provider server; and initiating, based on the determined at least one user authorization, a transmission of the content item to the at least one additional target user device.

At least one of the target user devices may comprise multiple content presentation applications and a proxy server for distributing received content items to the content presentation applications. The transmission of the content item may then comprise transmitting the content item to the proxy server. In case at least one of the target user devices comprises multiple content presentation applications, the transmission of the content item may additionally or alternatively comprise to include in the transmission an application identifier for identifying the application to which the content item is to be distributed in the user device.

Some implementations of the first method comprise the step of providing an indication to the content provider server indicating the one or more target user devices to which the content item has been transmitted. The indication may be used as a feedback by the content provider.

The first method may comprise the further steps of receiving a request for download of a content presentation application to a user device; determining if the content presentation application is authorized for download; and selectively initiating, based on the determination, the download of the content presentation application to the user device.

The above-mentioned demand is further satisfied by a second method which is performed in a provider registry. The method is for supporting control of transmission of a content item to user devices in a mobile communications network. The second method comprises the steps of receiving from a distribution control gateway a request indicative of a content provider server; and providing a response to the received request to the distribution control gateway, the response indicating a provider authorization of the content provider server for distributing the content item to user devices.

The above-mentioned demand is moreover satisfied by a third method which is performed in a user device. The method is for supporting control of transmission of a content item to user devices in a mobile communications network. The third method comprises the steps of receiving a content item from a distribution control gateway; determining to which of multiple content presentation applications implemented on the user device the content item is to be distributed; and distributing the received content item to the determined content presentation application.

The determination of the content presentation application may be based on a context of the user device, e.g. a current location of the device. A proxy server may be implemented on the user device and may operate to distribute the received content item according to the context and/or further criteria such as a type of the content, the content provider providing the item, etc. Additionally or alternatively, the determination of the content presentation application may be based on an application identifier received in association with the received content item.

Further, the abovementioned demand is satisfied by a computer readable medium having computer executable instructions for performing any of the methods described herein. The computer may comprise one or more computing devices for implementing, for example, a distribution control gateway, user device, provider registry or user registry. The computer readable medium may be a permanent or re-writeable memory, e.g. a flash or EEPROM, within or associated with a computing device or a removable CD-ROM, DVD or USB-stick.

The abovementioned demand is still further satisfied by a distribution control gateway. This gateway is adapted for controlling the distribution of a content item to user devices in a mobile communications network. The distribution control gateway comprises a Provider Access Controller ("PAC") control component adapted to receive, from a content provider server, a target user indication indicative of one or more target user devices for presentation of a content item; a provider registry access component adapted to access a provider registry for determining a provider authorization of the content provider server for distributing the content item to the target user devices; a user registry access component adapted to access, based on the determined provider authorization, a user registry for determining a user authorization for each of one or more of the target user devices for receiving the content item from the content provider server; and an initiation component adapted to initiate, based on the determined one or more user authorizations, a transmission of the content item to one or more of the target user devices.

The distribution control gateway may comprise a configuration component adapted to configure at least one of the one or more user authorizations. In one implementation, the distribution control gateway comprises a target determination component adapted to determine, based on at least one of the received target user indication, the content item, and an indication of the content provider server from which the target user indication has been received, at least one additional target user device not indicated by the target user indication; a user registry access component adapted to access the user registry for determining a user authorization for the at least one additional target user device for receiving the content item from the content provider; and an initiation component adapted to initiate, based on the determined at least one user authorization, a transmission of the content item to the at least one additional target user device.

The distribution control gateway may comprise at least one of an application management server adapted to manage multiple applications on a user device and a log-in server adapted to provide a login functionality to the content provider server.

According to one variant, the distribution control gateway comprises a multiplicator component adapted to multiplicate the content item for distribution to the target user devices.

Moreover, the abovementioned demand is satisfied by a provider registry. The provider registry is adapted for supporting control of the distribution of a content item to user devices in a mobile communications network. The provider registry comprises a reception component adapted to receive from a distribution control gateway a request indicative of a content provider server; and a response component adapted to provide a response to the received request to the distribution control gateway, the response indicating a provider authorization of the content provider server for transmitting the content item to user devices.

The abovementioned demand is further satisfied by a user device which is adapted for supporting control of the distribution of a content item to user devices in a mobile communications network. The user device comprises a first component adapted to receive a content item from a distribution control gateway; a second component adapted to determine to which of multiple content presentation applications implemented on the user device the content item is to be distributed; and a third component adapted to distribute the received content item to the determined content presentation application.

The second component of the user device may be adapted to determine the content presentation application based on a context of the user device. In one implementation, the second component of the user device comprises a proxy server adapted to determine the content presentation application based on an application identifier received in association with the received content item.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth with regard to a content provisioning system for distribution of advertisements in a mobile communications environment in order to provide a thorough understanding of the current invention. It will be apparent to one skilled in the art that the current invention may be practiced in other embodiments that depart from these specific aspects. For example, the skilled artisan will appreciate that the current invention may be practised not only for a delivery of advertisements or general news as described below to illustrate the invention, but may be practised for other purposes as well, such as a distribution of notifications (including notifications of client software updates), reminders, etc. As one example, the invention may be applied to control the distribution of specific news to a varying circle of users depending on the type of news (politics, business, sports, etc.), wherein the news may generally be provided to the mobile network by one or more publishers.

Those skilled in the art will further appreciate that functions explained below may be implemented using individual hardware circuitry, but also using software functioning in conjunction with a programmed microprocessor, field-programmable gate array (FPGA), application specific integrated circuit (ASIC), one or more digital signal processors (DSPs) or a general purpose processor. It will also be appreciated that when the current invention is described as a method, it may also be embodied in a computer processor and a memory coupled to the processor, wherein the memory is encoded with one or more programs that perform the methods disclosed herein when executed by the processor.

Figure 1:
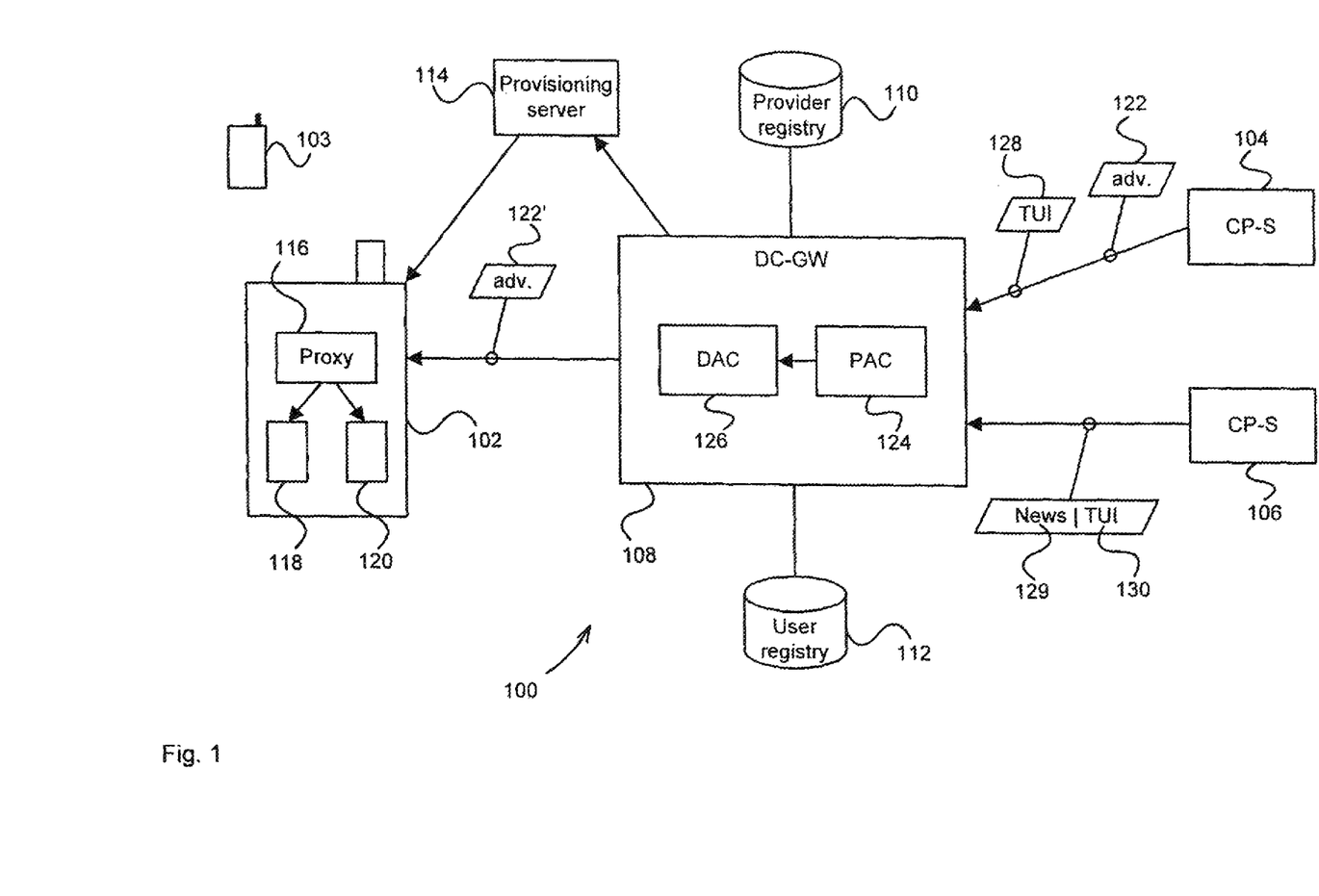
FIG. 1 schematically illustrates an embodiment of a mobile environment in which the invention may be carried out.

FIG. 1 illustrates an embodiment of a mobile environment including a mobile communications network 100, multiple mobile user devices 102 and 103 associated therewith, and content provider servers (CP-S) 104 and 106. While the mobile communications network (for short only referred to as 'mobile network' occasionally below) 100 comprises a plurality of different functional entities to enable a communication between the user devices 102, 103 and CP-Ss 104 and 106, only few functional entities are illustrated in FIG. 1 for the sake of illustrating the invention. Specifically, the mobile network 100 comprises a distribution control gateway (DC-GW) 108, a provider registry 110, a user registry 112 and a provisioning server 114.

The CP-S 104 and 106 may of course provide content items to a plurality of user devices associated with mobile network 100. Again for the sake of clarity, only the user devices 102 and 103 are illustrated. For later reference, the user device 102 is shown as comprising a proxy server 116 and at least two service applications 118 and 120. The user device 103 may comprise similar components, or may be configured differently as the user device 102.

The entities of the mobile network 100 illustrated in FIG. 1 enable a flexible control of the distribution of content items from the CP-S 104 and 106 to user devices such as user device 102 associated with mobile network 100. Consider as an example the CP-S is an advertisement server for providing advertisements, list of retailer goods, offerings, etc. to mobile users of network 100 currently in or in the vicinity of a retailer's shop. The CP-S 104 provides an advertisement 122 to the DC-GW 108. The DC-GW 108 accesses provider registry 110 and user registry 112 and decides, based on the consultation of these registries, to which user devices (and possibly which application of the user device) the advertisement is forwarded. For this purpose the DC-GW comprises a Provider Access Control (PAC) 124 and a Device Access Control (DAC) 126. The proxy server 116 on the user device forwards the advertisement to the appropriate one of the applications 118, 120. The provisioning server 114 is controlled by the DC-GW 108 to provide new or updated service applications to user devices. Generally, the DC-GW 108 may be one of one or more distribution control gateways of the mobile network 100.

Figure 2:
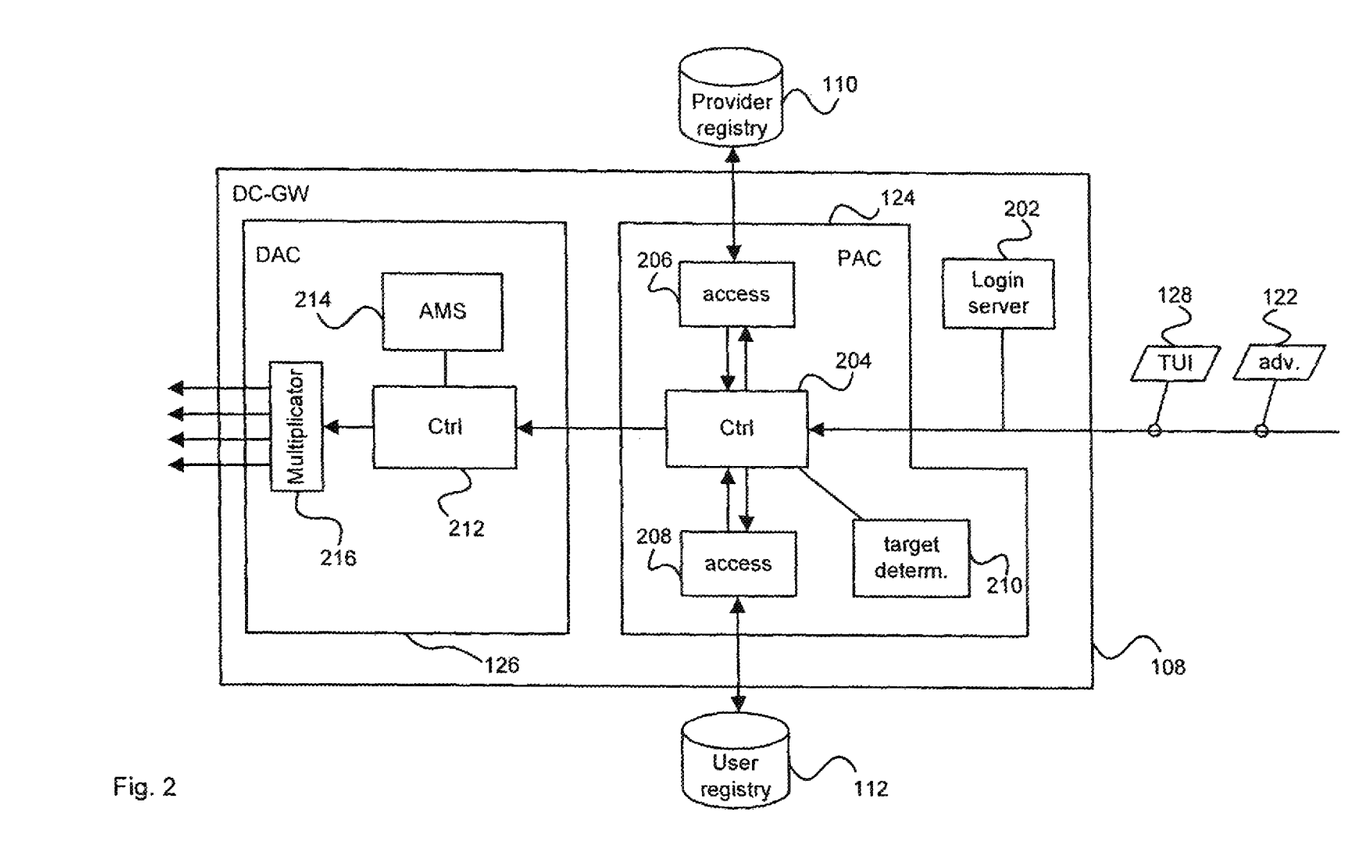
FIG. 2 illustrates functional components of the distribution control gateway of FIG. 1.

FIG. 2 illustrates in more detail functional components of the DC-GW 108 of FIG. 1. The gateway 108 comprises a login server 202; in the PAC 124 a PAC control component 204, registry access components 206 and 208, and a target determination component 210; and in the DAC 126 a DAC control component 212, an Application Management Server (AMS) 214 and a multiplicator 216.

A first embodiment of an operational mode of the DC-GW 108 will now be described with reference to the flow diagram in FIG. 3. For illustrative purposes, the following discussion will rely on the example scenario outlined above, in which the advertisement 122 is sent from the CP-S 104 (also referred to as 'advertisement server' 104 hereinbelow) to the mobile network 100 for distributing it to user devices such as user device 102. The advertisement 122 may, for example, be a banner advertisement intended for being rendered in a banner area of a webpage.

The DC-GW 108 controls a distribution of the advertisement 122 to user devices. Step 302 will be discussed further below. In step 304, a Target User Indication (TUI) 128 (cf. FIG. 1 or 2) is received from the CP-S 104. The TUI 128 is indicative of one or more target user devices for presentation of the advertisement 122. The TUI 128 may be sent from the CP-S 104 in direct association with the advertisement 122, e.g. in the same message, or may be sent separately before or after the sending of the advertisement 122. A login procedure performed between the CP-S 104 and login server 202 of DC-GW 108 may precede one or both of the sending of the advertisement 122 and the TUI 128. Such login procedure may for example comprise the setup of a secured connection between CP-S 104 and DC-GW 108 in order that a confidential transmission of advertisement 122 and/or TUI 128 can be performed.

The TUI 128 may indicate one or more specific user devices as target user devices for the advertisement 122. For example, the TUI 128 may indicate or represent an MSISDN or similar device identifier of user device 102 and further devices. Additionally or alternatively, user names of users of user devices or identifiers (IDs) of applications implemented on the user devices may be given. For example, an IP address of the proxy server 116, port numbers, etc. may be given. As a further or another possibility, the TUI 128 may comprise unspecific indications such as parameter indications or parameter value indications referring to particular parameters of user profiles in the user registry 112. As an example, the TUI 128 may indicate an age range of target users, gender, location area(s), but also type of contract (premium, basic, etc.), etc.

While it is illustrated in the figures and described above for reasons of illustration that the TUI 128 is a separate message, message part, data field in a message, or similar explicit indication separate from the content item 122, it is to be noted that in other embodiments there may be no separate, explicit TUI provided to the DC-GW. Instead, a TUI may be implicitly provided to a distribution control gateway such as DC-GW 108, which then would have to determine the intended target users from aspects related to the received content item. For example, as stated above, an explicit TUI message may indicate a network address of the content provider server. However, the DC-GW 108 may take the source address of the message 122 representing at least a portion of the content item as an implicit TUI, i.e. the DC-GW 108 takes the source address of message 122 as the network address (which may be, e.g., an IP (Internet Protocol) v4 or v6 address) of the CP-S 104, and performs the target user determination process based on this address. Additionally or alternatively, a type of content (text, image, etc.) indicated in or derivable from the content item 122 itself, a time of reception of the content item, etc. may be used by the CP-S 104 as an (implicit) TUI.

In some embodiments, due to the use of implicit TUIs, no explicit TUIs are needed. In still other embodiments, both explicit and implicit TUIs may be used by the content provider server for determining target users. For example, an explicit TUI such as TUI 128 may indicate a gender and an age range of the intended target users, and the content provider server uses in addition to these parameters the IP address of the content provider server as represented in the message (such as message 122) carrying the content item for determining the provider and/or user authorizations.

In the embodiment illustrated in FIGS. 1 and 2, both the advertisement 122 and the TUI 128 are received in the PAC control component 204. In other embodiments, a content item may be received by a functional entity of a distribution control gateway (or mobile network) different from the entity receiving the target user indication. For example, advertisements may be sent beforehand and stored in an advertisement repository, wherein the repository is provided by the mobile communications network for this purpose. An extraction of the advertisement and presentation to users may then only be triggered by the reception of a target user indication. The target user indication would then comprise as a mandatory field an indication of which advertisement(s) it relates to.

In step 306, the PAC control component 204 is triggered by the reception of TUI 128 to in turn trigger access component 206 to access the provider registry 110 for determining a provider authorization related to the CP-S 104 for distributing the advertisement 122 to the target user devices.

Figure 6:
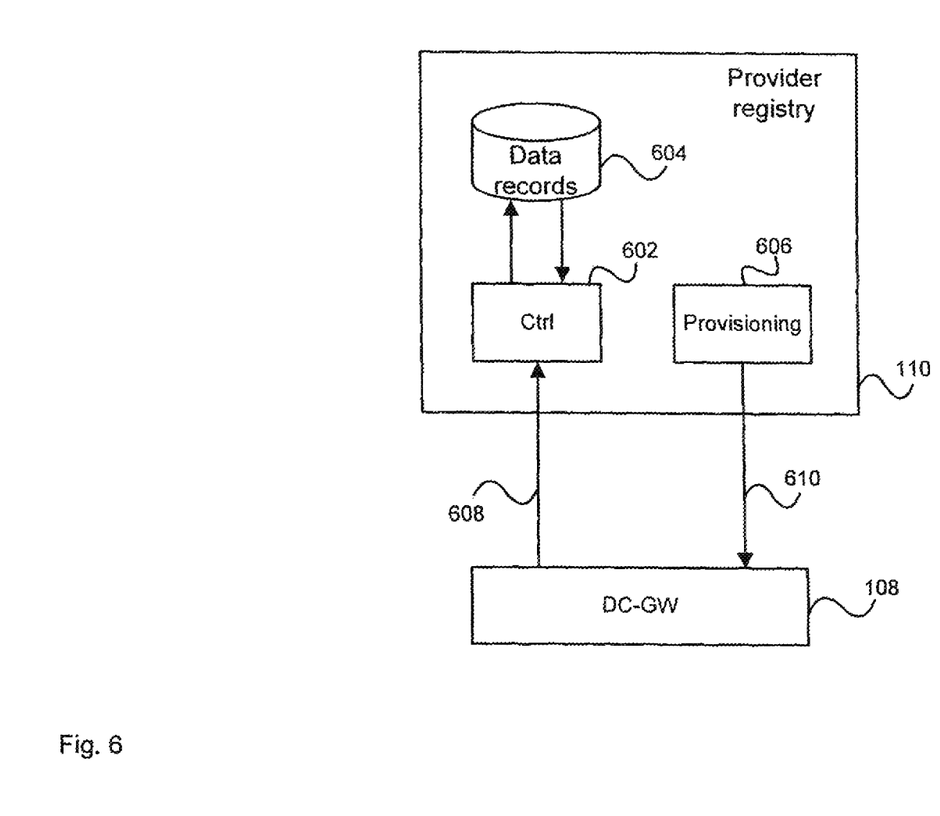
FIG. 6 illustrates functional components of the provider registry of FIG. 1.
Figure 7:
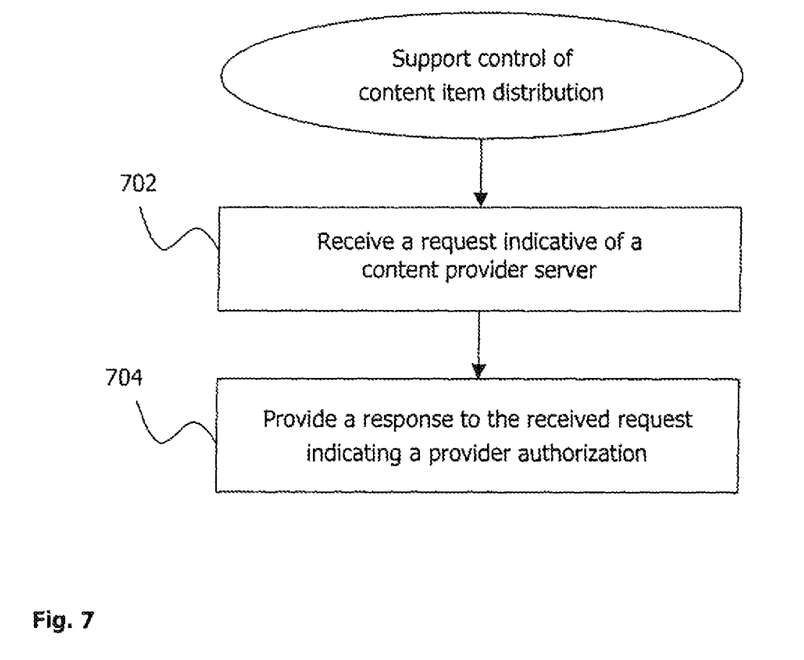
FIG. 7 is a flow diagram illustrating an operation of the provider of FIG. 6.

The provider registry 110 may comprise a plurality of data records, wherein at least one data record is related to the CP-S 104 (see FIGS. 6 and 7 for a more detailed discussion). This data record may represent, for example, a general registration of the CP-S 104 for the mobile network 100. The registration may include the general permission to provide content items to the mobile network 100, or at least the DC-GW 108 (in case the provider registry 110 is locally associated with DC-GW 108.

Additionally or alternatively to a general registration, the provider authorization may comprise more specific details, such as a type of content a content provider server is authorized to send to the mobile communications network 100. For example, the CP-S 104 may be authorized to send advertisements, but not news, or may be authorized to send advertisements and news of a particular kind only to the network 100, for example advertisements for sports and sports news. Provisioning of content items may also be restricted with regard to a data size of content items, a data type of content items, a format or structure of content items, or with regard to a time range, within which an authorization is valid. The provider authorization may also or only comprise indications of one or more user devices or user groups to which content items can be distributed. Such indications may relate to similar aspects as what has been described above for the target user indications. As an example, the provider authorization may indicate user groups characterized by user profile parameters such as gender, age, location, etc. Another example of an alternative or additional condition is that the provider authorization may be restricted to send content to not more than to a maximum number of user devices. Yet another alternative or additional condition may be that the provider authorization is restricted to one or more certain geographical areas/network cells.

The task of matching the received TUI 128 with the provider authorization for the CP-S 104 and determining whether the CP-S 104 has the appropriate access rights may be performed in the provider registry 110, the PAC control component 204, access component 206 or a combination of these components. Based on the determined provider authorization, in step 308 the PAC control component 204 triggers the access component 208 to access the user registry 112 for determining a user authorization for each of one or more target user devices for receiving the content item from the CP-S 104. More specifically, the users or user groups which have been determined in step 306 as being permissible targets from the point of view of the provider authorization are indicated to the access component 208, which queries the user registry 112 for user authorizations for each of these target users or user groups.

A user authorization may indicate, for example, one or more content provider servers which are allowed to send content items to the user device of the user. The permission may also specify particular applications on the user device. As a further example, a user authorization may indicate a type of content or type of content item the or any content provider server is authorized to send. For example, the user of user device 102 of FIG. 1 may have authorized the CP-S 104 to send sports news and advertisements (such as advertisement 122) for sports goods.

The user authorizations stored in registry 112 may be configured and administered by the operator of the mobile communications network 100 and/or the respective users. For example, a user may be allowed to define restrictions according to its type of subscription. For some subscription types the operator may prescribe permission to receive advertisements, news, etc. (for example the user may be forced to receive news and offerings from the mobile operator's content provider server itself). The step 302 in FIG. 3 reflects this kind of configuration of one or more of the user authorizations provided in the user registry 112. The configuration may be accomplished by, for example, the PAC control component 204 of DC-GW 108 acting as a configuration component.

Referring back to steps 306 and 308, in a simple example inspecting the provider authorization stored in provider registry 110 and related to the CP-S 104 may have revealed that the CP-S 104 is authorized to send advertisements to any target users, such that the TUI 128 received from the CP-S 104 has not been restricted any further and may provided as such to the access component 208. In another example, the provider authorization may limit the provisioning of content items for the CP-S 104 to a specific group of users, such that the TUI 128 has been limited. Consider, for example, that according to the provider authorization the number of users to which advertisement 122 may be presented is limited to a maximum number. In this case, the access component 208 would receive the TUI 128 plus the maximum number and would then have to operate to determine an appropriate subset of all user devices to which the advertisement 122 may be actually presented to in order to observe the maximum number prescribed in the provider authorization.

The result of step 308 may be a list of selected target user devices, to which the advertisement 122 may be distributed. The list of selected target user devices may or may not coincide with the target users as indicated in the TUI 128, i.e. the advertisement 122 may be distributed to less user devices or may be distributed to more user devices as indicated in TUI 128 (this possibility will be described in detail below). In a simple example, the corresponding user authorizations impose no further restrictions preventing a distribution according to the TUI 128.

The list of selected target user devices may be constructed by any of the user registry 112, the access component 208, the PAC control component 204, or a combination of these components. In step 310, the PAC control component 204 operates as an initiation component and initiates, based on the one or more determined user authorizations, a transmission of the advertisement 122 to the selected target user devices. More specifically, the PAC control component 204 provides the advertisement 122 (or an indication thereof) and the selected target user devices to the DAC control component 212.

The DAC control component 212 controls transmission of the advertisement 122 to the selected target user devices. First of all, either one of the control components 204 and 212 may operate to appropriately adapt the advertisement 122 for transmission. For example, the advertisement 124 may be re-formatted or otherwise transformed such that it is suited for transmission over a radio interface of the mobile communications network 100 and/or is suited for a presentation on the selected user devices. For instance, the advertisement 122 may not be specifically adapted to a presentation on a small screen of mobile user devices. The DAC control component or the AMS 214 may perform adaptation of the advertisement 122 to a mobile environment by, e.g., reducing graphical image portions of the advertisement 122 or by entirely skipping these, such that an advertisement 122' (cf. FIG. 1) may include only the text portions of the advertisement 122 provided by the CP-S 104.

Turning further to the AMS 214, this server is provided for control provisioning of service applications to user devices associated with the network 100, such as applications 118 and 120 on user device 102 (see this aspect of the AMS in more detail below) and is further provided for addressing these applications on the user devices.

Consider, for example, advertisement 122 is to be provided to application 118 on user device 102. As the user device 102 has the proxy server 116 implemented thereon, which has the task to further distribute content items to the appropriate application, the AMS 214 provides an indication of the proxy server 116 to the DAC control component 212 in order that the advertisement 122 can be transmitted thereto. For user devices which do not have implemented a proxy server thereon, the AMS 214 operates to provide an application identifier to the DAC control component 212 for identifying the appropriate application 118 to which the advertisement 122 is to be distributed. The AMS 214 may have a repository associated therewith (not shown) which stores identifiers (IP addresses, ports, etc.) of proxy servers and/or applications on the user devices controlled by the DC-GW 108 (more precisely the DAC 126).

The DAC control component triggers the multiplicator component 216 in order to distribute the advertisement 128 to the selected user devices. The multiplicator component 216 may multiply the advertisement 128 (i.e. a message or set of messages representing the advertisement 128) and initiate the setup of a number of unicast connections to each of the selected target user devices. Additionally or alternatively, a multicast session may be opened.

As a still further possibility, for large and/or geographically well defined user groups, a broadcast transmission may be set up, for example in case all selected user devices are located in a particular area, such as a cell of the mobile network 100 covering a retailer's shop. The multiplicator 216 may also decide for a combination of these possibilities.

The advertisement 122 may be provided essentially simultaneously to the selected target user devices (as in the case of a broadcast transmission), but may also be provided at individual time points to each of the selected user devices. In this case, the advertisement 122 may be stored in a repository associated with the DC-GW 108 until each selected user device has been provided therewith. For example, the advertisement 122 may be provided to user device 102 or the particular application 118 thereon as soon as the user initiates execution of the application 118, e.g. because the user device 102 enters the location of the retailer's shop.

Figure 3:
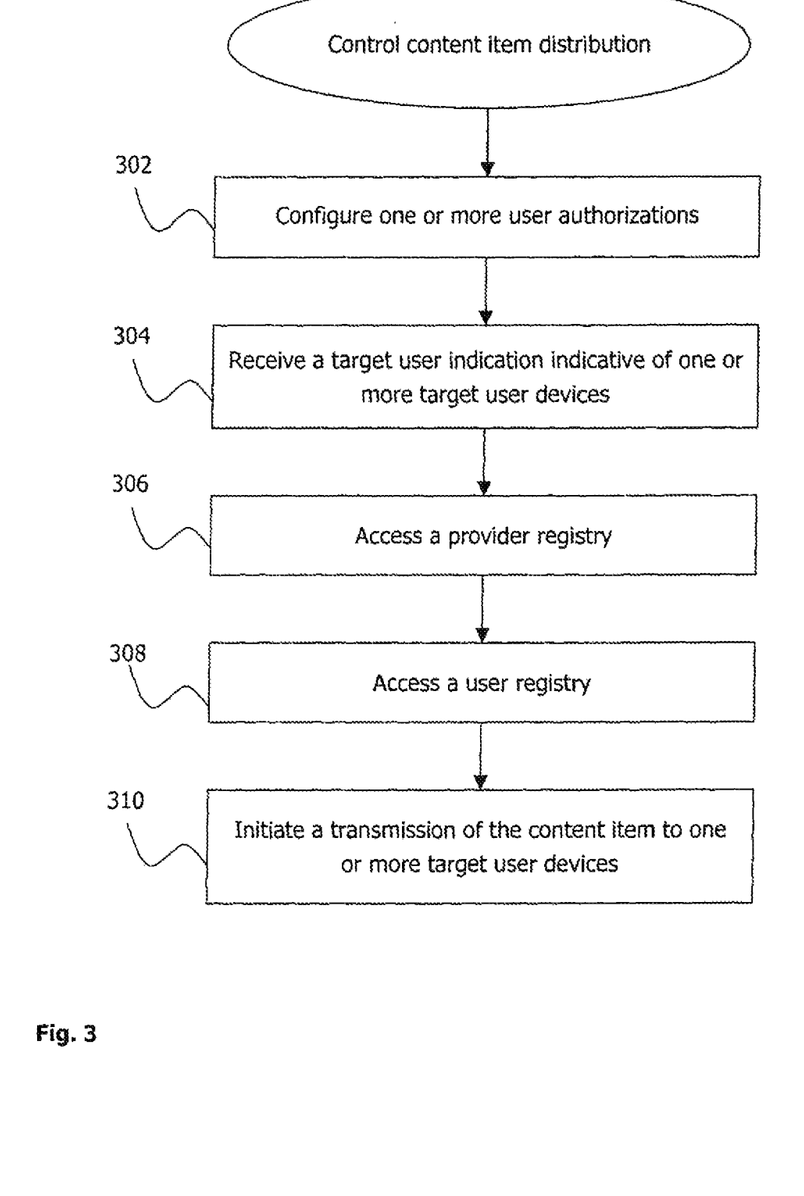
FIG. 3 is a flow diagram illustrating a first embodiment of an operational mode of the distribution control gateway of FIG. 2.
Figure 4:
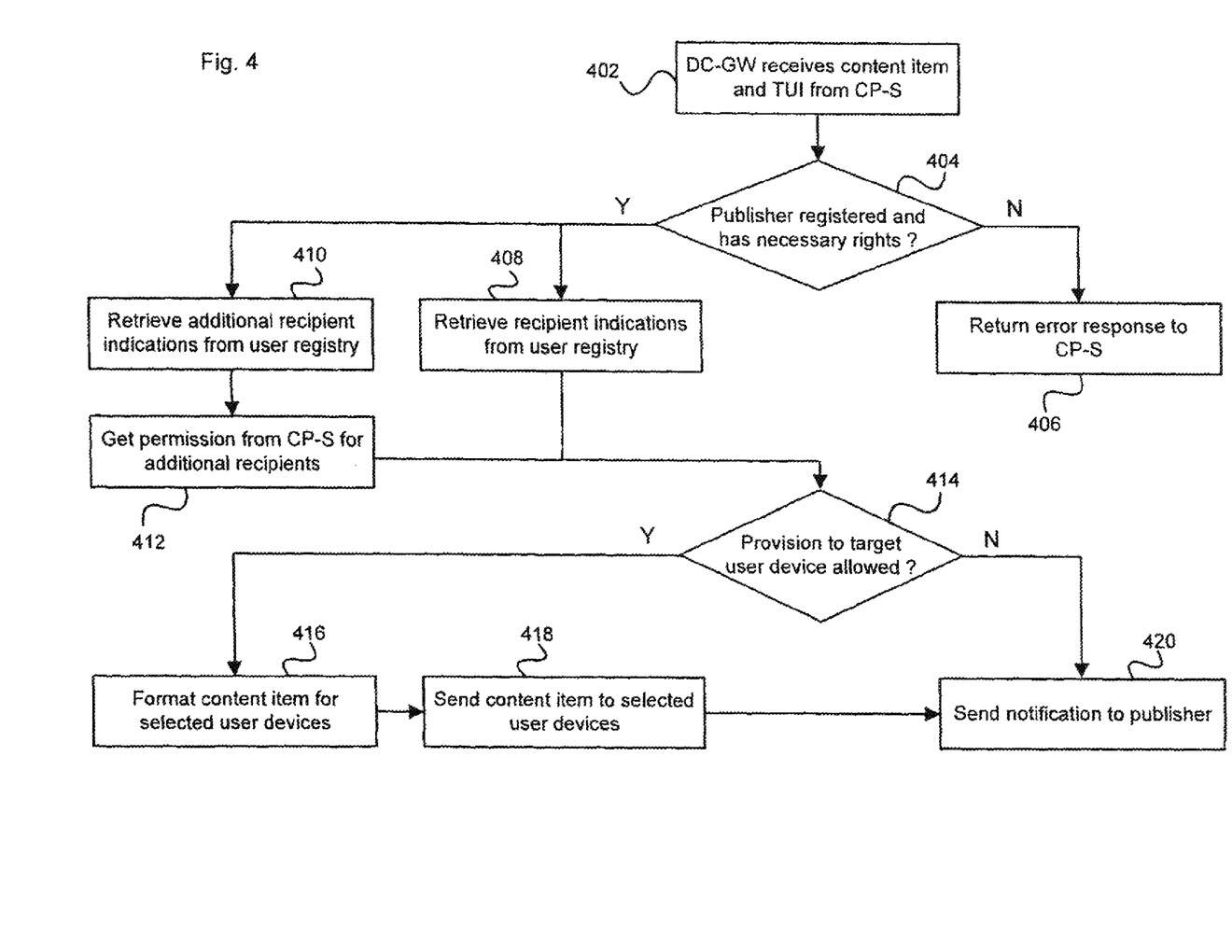
FIG. 4 is a flow diagram illustrating a second embodiment of an operational mode of the distribution control gateway of FIG. 2.

FIG. 4 illustrates a second embodiment of an operational mode of the DC-GW 108 of FIGS. 1 and 2. In order to avoid repetitions, the following discussion concentrates on those aspects which are different between the first and second embodiments depicted in FIGS. 3 and 4, respectively. Thus, any aspect not explicitly mentioned hereinbelow may be as has been explained with reference to the first embodiment and FIG. 3.

For the sake of illustration it is assumed that the second embodiment is related to the CP-S 106 being a news server providing a news item 129 (cf. FIG. 1) to the mobile network 100 for the purpose of distributing it to the application 120, here being a news application, on the user device 102. In step 402, the DC-GW 108 receives the news item 129 from the news server. In conjunction with item 129, a related TUI 130 is provided which indicates in this example the target audience based on selection parameters (user profile parameters). The DC-GW 108 may take, for example, the source address of the message carrying the news item 129 as an additional, implicit part of the TUI 130 by considering this source address as the network address of the CP-S 106 and using it for determining the provider authorization and/or the user authorizations. The operation of the PAC 124 with regard to step 402 may be similar to what has been discussed with regard to step 304.

The PAC 124 may further operate in step 404 to determine whether the publisher, i.e. the operator of the CP-S 106, is registered with the mobile network 100 and has the necessary rights for providing the news item 129 to user devices of the mobile network 100. The operation of the PAC 124 with regard to step 404 may be similar to that of step 306 discussed further above. In case it is determined in step 404 that the provider authorization for the CP-S 106 does not allow a distribution of the news item 129, in step 406 an error response is returned to the CP-S 106 (or another suitable entity related to the news provider operating server 106).

In case it is determined in step 404 that the publisher has the necessary rights, in step 408 indications of possible recipients (target user devices) are retrieved from user registry 112 based on the received user profile parameters (for example, gender, age, or current location). As step 408 may be performed in a similar way as has been described for step 308, the details thereof are not repeated here.

In step 410, the target determination component 210 operates to determine indications of additional target user devices. These additional recipients are not indicated by the TUI 130 associated with the news item 129. For example, the user device 102 may be indicated in the TUI 130, while the user device 103 is not. The user device 103 may then be determined as an additional target user device. The additional target user devices may be determined from the user registry 112 based on, for example, the received news item 129, the TUI 130, an indication (such as the server address) of the CP-S 106, or a combination thereof. As a concrete example, additional target user devices may be determined from an indication of a particular geographical presentation area (e.g. a city or region) included in the TUI 130. The component 210 may determine from the registration record related to the CP-S 106 in provider registry 110 that other news items are regularly also intended for a second geographical presentation area. Additional target user devices may thus be determined, which are currently located in the second presentation area.

In step 412, an indication of the additional target user devices is provided to the CP-S 106 (not indicated in FIG. 1 or 2). Taking the above example further, for example the number of additional target user devices which are currently located in the second presentation area can be provided back to the publisher.

It is assumed that the publisher permits presentation of the news item 129 to the additional target user devices identified in step 410. Then, in step 414, for each of the target user devices determined in steps 408 and 410 the user registry 112 is accessed in order to determine for each of these target user devices whether a user authorization allows distribution of the news item 129 towards the respective user device. This step may be performed in a similar way as has been described for step 308 above.

For those target user devices which are selected in step 414 for transmission of the news item thereto, in step 416 the news item 129 is formatted, e.g. in the DAC control component 212. In step 418, the news item 129 is sent to the proper news service application on the selected user devices, including, e.g. application 120 on user device 102. In step 420, a notification is sent to the CP-S 106 (or another entity provided for this purpose by the publisher related to the server 106). The notification may indicate to which user devices the news item 129 has actually been presented. The notification may also include an indication of the users to which the news item has not been presented. As an example, the notification may indicate the number of not/selected target user devices. As another example, the notification may indicate the number of user devices to which the news item 129 was actually delivered in relation to the number of users which where targeted by the TUI 130, and may also indicate which fraction of the users targeted according to the TUI 130 actually have an appropriate user authorization.

A still further embodiment of an operational mode of the DC-GW 108 of FIG. 1 will now be described with reference to the message sequence diagram of FIG. 5. The subsequent discussion concentrates on those aspects which are different to the first and second embodiments depicted in FIGS. 3 and 4, respectively. Any aspect not explicitly mentioned hereinbelow may be understood as has been explained with reference to the first embodiment and FIG. 3. For purposes of illustration, it will again be assumed that CP-S 106 provides news item 129 to the DC-GW 108.

The functional entities involved are the CP-S 106 ("Publisher server"), the PAC 124 and DAC 126 of the DC-GW 108 of FIG. 1, provider registry 110, user registry 112, and proxy server 116 and news application of user device 102. The PAC 124 and DAC 126 may be provided as a single entity, possibly on one hardware platform, or may be provided as separate entities, possibly also on separate hardware platforms.

With message 501 the publisher server 106 sends the news item 129 and TUI 130 to the PAC 124. Message 501 may for example be a HTTP POST message and may include the news item 129, an indication of the data size of the news item 129, an application identifier (application ID) indicative of the news service application 120 required for presentation of the news item 129 on user devices such as user device 102, the TUI 130, and a content provider identification (provider ID) indicative of the publisher server 106.

With message 502, e.g. an HTTP GET message, the PAC 124 accesses provider registry 110 based on the provider ID (and possibly application ID) in order to determine the provider authorization for the publisher server 106. Message 503 is a response message, e.g. a HTTP response, provided from the provider registry 110 to the PAC 124. The details of the processing related to messages 501 to 503 may be as has been described for the steps 304 and 306 in FIG. 3 or steps 402 and 404 in FIG. 4.

Based on the response message 503, the PAC 124 may determine for which target user devices served by the mobile network 100 the news item 129 can be distributed to from the point of view of the provider authorization. Accordingly, the PAC 124 provides a message 504, e.g. a HTTP POST message, towards the DAC 126. Message 504 may comprise the news item 129 as received with message 501 (possibly reformatted), the TUI 130 and the application ID.

Figure 5:
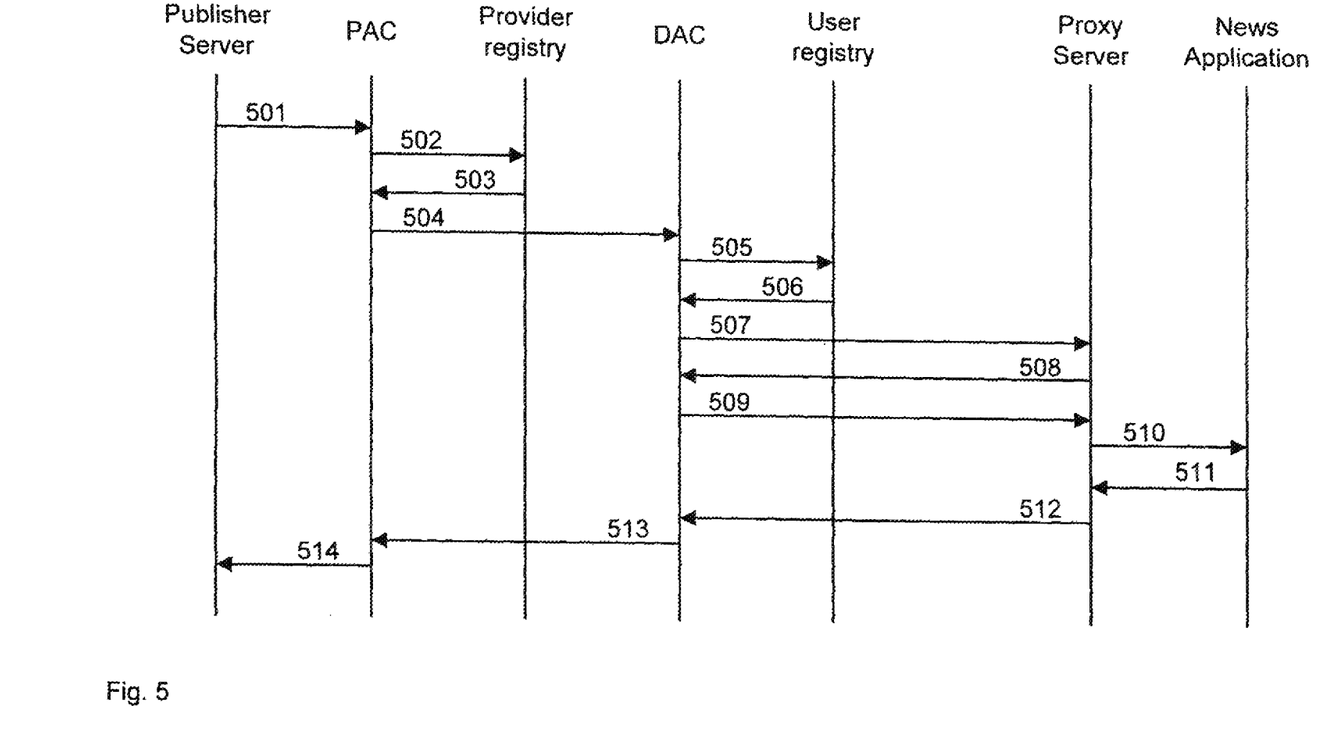
FIG. 5 is a sequence diagram illustrating a third embodiment of an operational mode of the distribution control gateway of FIG. 2.

The embodiment of FIG. 5 differs from the embodiments of FIGS. 2, 3 and 4 in that the PAC 124 only accesses the provider registry 110, while the access to the user registry 112 is performed by the DAC 126. Accordingly, the DAC 126 provides message 505, e.g. a HTTP GET message, to user registry 112. The message 505 may include the TUI 130 as it has been received with message 501, or may include further restrictions determined from the provider authorization stored in the provider registry. In other embodiments, the message 505 may be less restrictive than the TUI 130, namely in case additional target user devices or additional target user groups have been determined by the DC-GW 108.

As a simple example, the TUI 130 may be transmitted as received in message 501 with message 505 to the user registry 112. The TUI 130 may indicate "retrieve all user devices associated with users having an age between 19 and 49 and being currently located within an area defined by 'area_id'". The predefined area_id may for example indicate a geographical area of a city as covered by one or more cells of the mobile network 100. The user registry 112 responds with message 506, e.g. a HTTP response message, which indicates (e.g. by MSISDN) the specific user devices matching with the TUI 130.

The DAC 126 sends message 507, e.g. a HTTP GET message, towards each of the selected user devices, however only the message to the proxy server 116 of user device 102 is shown in FIG. 5 for illustrative reasons. As message 507 is directed to the proxy server 116, the destination address thereof may have been retrieved with the response message 506 from the user registry 112, or an Application Management Server similar to the AMS 214 of FIG. 2 may have provided the proxy server address. Message 507 may comprise an indication that a news item is ready for being transmitted. The message 507 may for example indicate the size of news item 129. With response message 508, e.g. a HTTP response message, the proxy server 116 acknowledges readiness for reception of news item 129. Then, the DAC 126 provides with message 508, e.g. an HTTP POST message, the appropriately formatted news item 129 together with the application ID for the application 120 to the proxy server 116.

With message 510, e.g. a HTTP POST message, the proxy server 116 forwards the received news item 129 towards the news application. In the case that the application ID is provided by the DAC 126 and therefore is available to the proxy server 116, the task of the proxy server 116 is simple forwarding. In case no application ID is provided, the proxy server 116 has to determine the proper application to which to forward the received content item in another way, as described elsewhere herein. In one example, the DAC 126 provides instead the application ID the provider ID related to the publisher server 106, which may be used by the proxy server 116 to identify the news application.

With (HTTP) response message 511, the news application approves to the proxy server 116 presentation of the news item 129. The proxy server in turn informs by (HTTP) response message 512 the DAC 126. A further (HTTP) response message 513 is sent by the DAC 126 to the PAC 124, which in turn sends a (HTTP) response message 514 towards the publisher server 106. Messages 513 and 514 may collect various feedbacks from multiple user devices.

FIG. 6 illustrates in detail functional components of provider registry 110 of FIGS. 1 and 2. The provider registry 110 of FIG. 6 comprises a reception and control component 602, a storage component 604 and a response component 606.

The provider registry 110 may either be locally associated with DC-GW 108, or may be a central provider registry serving several distribution control gateways in the mobile network 100. An operation of the provider registry 110 is now described with reference to the flow diagram in FIG. 7. Generally, the provider registry 110 operates to support control of the transmission of content items to user devices in mobile communications network 100.

In step 702, the control component 602 receives from the DC-GW 108 a request indicative of a content provider server, e.g., CP-S 104 or 106. For illustrative purposes, in the following it is exemplarily assumed that the message 502 of FIG. 5 is received as a request 608 at the control component 602, i.e. the request 608 is indicative of the CP-S 106. The control component 602 processes the received request 608 and accesses storage component 604 for determining whether the CP-S or publisher server 106 is authorized to send news item 129 to the target users indicated by the TUI 130. The provider registry 110 may store for each provider registered therein a data record which may, e.g., comprise a provider ID and a server address of the content provider server. A further data field in the data record may be a type ID of the content representing a particular type of content item such as 'sports news', 'political news', 'business news', etc., according to a set of predetermined ID numbers. The news item 129 then has to indicate a corresponding type ID. Further data fields may relate to a maximum allowable size of an item and to identifiers of presentation areas in which the provider is allowed to present content items (such presentation area may, e.g., comprise one or more cells of the mobile network 100).

One or more further data fields may be provided in the data record which indicate profile parameters of user profiles as stored in the user registry 112, e.g. gender, age or current location, and possibly allowable values or value ranges thereof. As a still further possibility, the data record may indicate a publication ID relating to a particular service, e.g. a news service provided by the CP-S 106 to particular users of the mobile network 100 which are customers of the news service. The publication ID may be extracted from the data record relating to the CP-S 106 and delivered to the DC-GW 108 for identifying the customers of the news service. Additionally or alternatively, the publication ID may be included in the TUI 130 and in the request 608 for comparison with the related data field in the relevant data record.

In step 704, a response 610 to the request 608 is provided to the DC-GW 108. One example for the response 610 is the message 503 in FIG. 5. The response 610 indicates, in this example, a provider authorization of the CP-S 106 for distributing the content item 129 to user devices associated with mobile communications network 100. It depends on the details of a concrete embodiment of whether the provider registry 110 merely operates to retrieve the data record related to the CP-S 106 from the storage component 604 and to provide this data record to the DC-GW 108, or whether at least a portion of the determination process if a distribution of the news item 129 is allowable according to the provider authorization is performed in the provider registry 110. In the former case, the response comprises the data record retrieved from the storage 604, in the latter case the response may simply indicate a positive or negative result of the determination process.

The user registry 112 of FIGS. 1 and 2 may be a central component of the mobile communications network 100, which is, for example, implemented as or associated with an HSS (Home Subscriber Server). In other embodiments, the user registry 112 is implemented as a local component associated with a particular distribution control gateway such as the DC-GW 108. As an example, the user registry 112 may comprise a local image of a relevant portion of the user profiles provided in a central HSS in the mobile network 100.

The user registry 112 may have a functional structure similar to that illustrated in FIG. 6 for the provider registry 110. The user registry 112 may comprise a list of user authorizations each associated with a user device and/or a particular application implemented on a user device. In other words, for each subscriber or user of the mobile network 100 (or a subset thereof) there may be provided at least one data record. Each data record may comprise, for example, in association with a user ID one or more provider IDs identifying providers allowed to provide content items to the respective user device. The provider ID may indicate, for example, a server address such as an address of the CP-S 106. A further data field may represent a content type ID indicating an allowed type of content (text, image, video, or combination thereof). A still further data field may represent a content item type ID indicating an allowed type of content item (news, etc.) similar to what has been described above for the provider registry 110. Another data field may indicate a maximum allowable size for a content item, which may, for example, be configured by the mobile network operator according to the capabilities of the user device.

The user registry 112 may in some embodiments also comprise location information associated with a user device, which e.g. indicates a current position of the user device. Such location information may be retrieved and uploaded (for example at regular intervals) from an external user database, such as an HSS of a network operator if the user registry 112 is not implemented in the same host device as the HSS. Alternatively the positioning data may be retrieved (upon agreement) directly from the user devices, e.g. in case a user device in the form of a mobile phone knows in which cell of the mobile network the user device currently is positioned in. Some user devices are also equipped with a GPS and thus may provide GPS-based location information to the user registry 112.

In still other embodiments, location information may also be provided to the distribution control gateway from a database other than the user registry 112, such as a location broker server or an HSS, without uploading the positioning data in the user registry 112.

With exemplary reference to user device 102 of FIG. 1, a further data field of the data record relating to this user device may indicate an address of the proxy server 116. Another data field or fields may be related to user device capabilities, for example one data field may indicate whether the user device is Java-capable. Further data fields in this data record may be related to each of the applications 118 and 120. These data fields may each comprise subfields indicating, for example, an application ID, a maximum size for a content item to be delivered to this application, a required structure or format of the content items to be delivered thereto (HTML, Java, etc.) and/or other indications related to requirements of the application.

The process of determining, based on a user data record, if a content item can be delivered to the corresponding user device can be performed in the DC-GW 108, the user registry 112, or in both.

Figure 8:
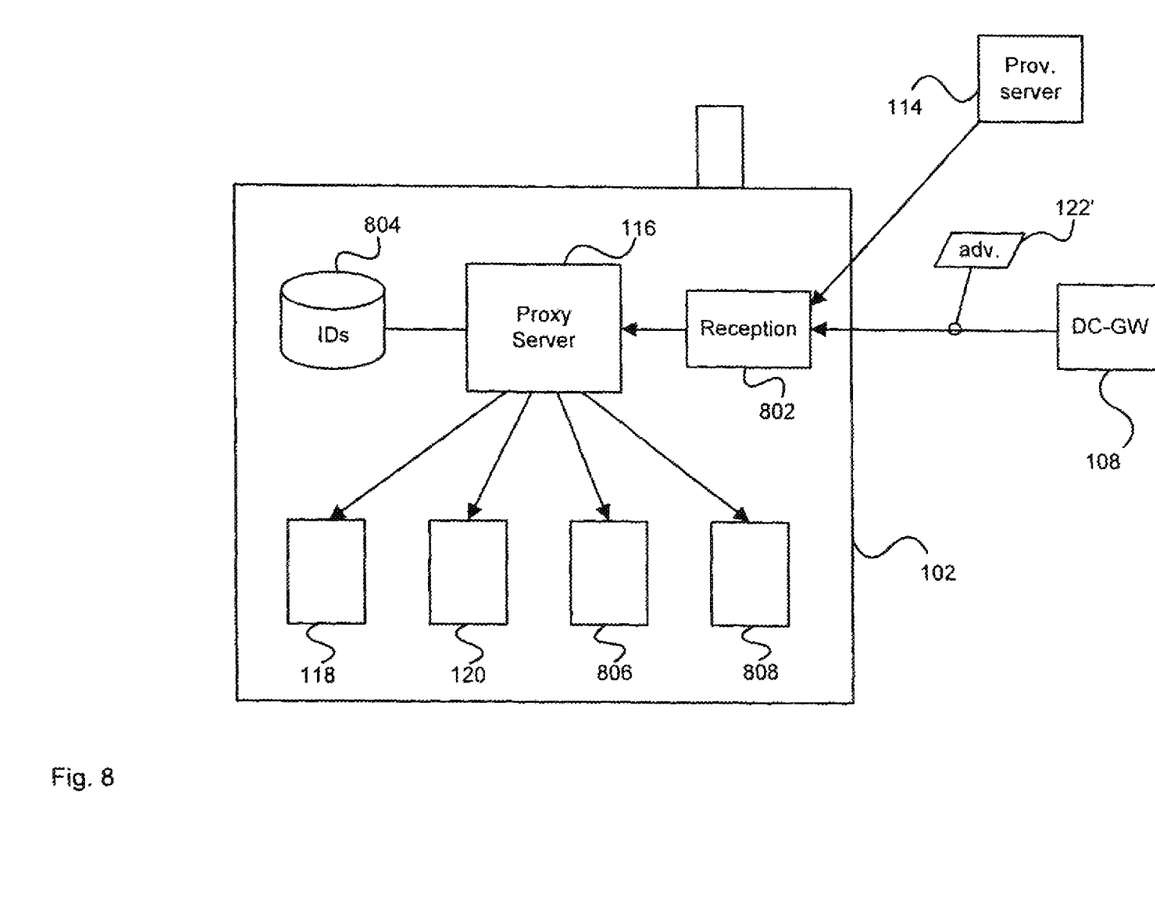
FIG. 8 illustrates functional components of the user registry of FIG. 1.

FIG. 8 illustrates in further detail functional components of the user device 102 of FIG. 1. Specifically, the user device 102 comprises a reception component 802, the proxy server 116, a storage component 804, and multiple content presentation service applications 118, 120, 806 and 808.

Figure 9:
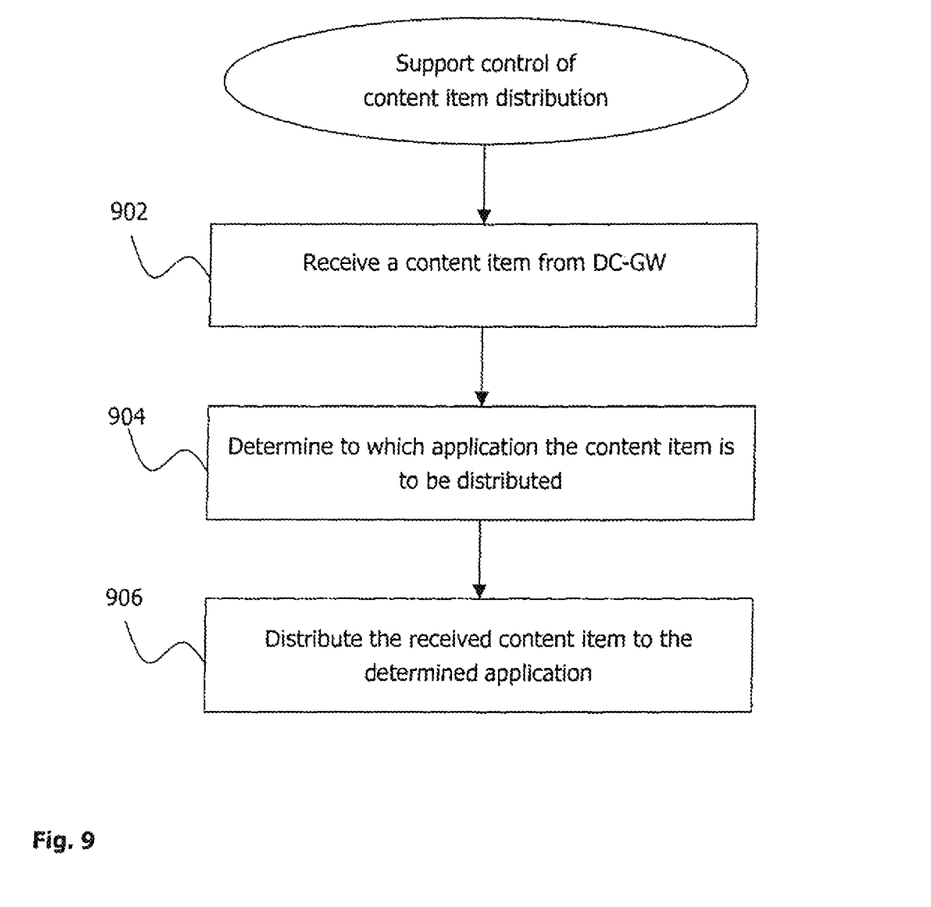
FIG. 9 is a flow diagram illustrating an operation of the user registry of FIG. 8.

An operation of the user device 102 will be described with reference to the flow diagram of FIG. 9. Generally, the user device 102 is adapted to support a control of the transmission of content items to the user device 102 by the mobile communications network 100. For purposes of illustration, the discussion refers to the embodiment illustrated in FIGS. 1-3, in which advertisement 122' is provided to the application 118 in user device 102.

In step 902, the reception component 802 receives the advertisement 122', e.g. embedded in an HTTP message, from the DC-GW 108. As the message is directed to the proxy server 116, the reception component 802 forwards the message thereto. In step 904, the proxy server 116 determines the application to which the received advertisement 122' is to be provided. This task is simple, as described hereinbefore, in case an application ID is delivered together with the advertisement 122'. In this case the proxy server 116 may simply access storage component 808 in order to determine an internal address of the application 118 based on the received application ID. In case no application ID (or other indicator) is received in association with the advertisement 122', the proxy server 116 has to determine the appropriate application based on other indicators. For example, the proxy server 116 may determine which of the multiple applications 118, 120, 806, 808 are currently running, and/or may determine a type of the content (e.g., text, image, video data, etc.) included in the advertisement and may conclude from this type of content to which application to deliver the received content item. In step 906, the proxy server 116 distributes the received advertisement 122' to the determined application 118.

The provisioning server 114 of mobile communications network 100 (cf. FIG. 1) is controlled by the DC-GW 108 to provide new or updated service applications to the user device 102. The download of such an application from the provisioning server 114 may be triggered by the device 102. As an example, a user may visit a retailer's store and may initiate download of a service application for presenting goods sold by the retailer on a screen of the user device 102 by actively providing the user device near to an NFC (Near Field Communication) or RFID (Radio Frequency IDentification) device. In this process an indication (application ID) of the required service application may be provided to the user device 102, which then sends this indication to the DC-GW 108. The DC-GW 108 operates to check whether the corresponding application is registered and whether its download to the user device 102 is allowable. If so, the request including the application ID is forwarded to the provisioning server 114, which then performs download of the corresponding service application to the user device 102.

In a different embodiment, the download of a service application might be triggered by an SMS sent from, e.g., the distribution control gateway to the user device. The user would then have to trigger application downloading by acknowledging reception of the SMS. Based on the received acknowledgement, download of the application would be initiated and one or both of the provider registry and user registry may be re-configured in order that a content provider server is allowed to present content items to the user device.

The invention allows to simplify the establishment of new content distribution services in a mobile environment including, on the one hand, a plurality of user devices with multiple service applications implemented thereon and, on the other hand, multiple content provider servers. Provisioning of a distribution control gateway in the mobile communications network enables a centralized access control for content items sent by the content providers towards the user devices. The distribution control gateway may manage and operate on the basis on network-access restrictions (stored in the provider registry) and device-access restrictions (stored in the user registry). Moreover, the distribution control gateway may act as a central management entity for the service applications on the user devices. The distribution control gateway allows to automate the introduction of new services at least to a large part, as there is no need to separately configure each new application with regard to, e.g., the network an device access restrictions. For example, a content provider server may be registered in the mobile network for multiple content presentation services. Moreover, the introduction of the distribution control gateway in the mobile communications network enables to efficiently handle the interworking of multiple applications on multiple user devices and multiple content providers, while keeping the mobile network architecture clear and lightweight.

While the current invention has been described in relation to its preferred embodiments, it is to be understood that this description is for illustrative purposes only. Accordingly, it is intended that the invention be limited only by the scope of the claims appended hereto.

What is claimed is:

1. A method for supporting control of transmission of a content item to a user device in a mobile communications network, the method being performed in the user device and comprising:
   receiving the content item and an application identifier associated with at least one of multiple content presentation applications implemented on the user device from a distribution control gateway of the mobile communications network;
   determining to which of the multiple content presentation applications implemented on the user device the content item is to be distributed based on the application identifier received in association with the received content item; and
   distributing the received content item to the determined content presentation application.

2. The method according to claim 1, wherein determining to which of the multiple content presentation applications implemented on the user device the content items is to be distributed comprises determining to which of the multiple content presentation applications implemented on the user device the content items is to be distributed based on a context of the user device.

3. The method according to claim 1, wherein one of the multiple content presentation applications comprises a news service application.

4. The method according to claim 3, further comprises providing a news item on the news application of the user device.

5. A user device configured to support control of the distribution of a content item to user devices in a mobile communications network, the user device comprising:
   a first circuit configured to receive the content item and an application identifier associated with at least one of multiple content presentation applications implemented on the user device from a distribution control gateway of the mobile communications network;
   a second circuit configured to determine to which of the multiple content presentation applications implemented on the user device the content item is to be distributed based on the application identifier received in association with the received content item; and
   a third circuit configured to distribute the received content item to the determined content presentation application.

6. The user device according to claim 5, wherein the second circuit is configured to determine the content presentation application based on a context of the user device.

7. The user device according to claim 5, wherein one of the multiple content presentation applications comprises a news service application.

8. The user device according to claim 7, wherein a news item is provided on the news application of the user device.

* * * * *